United States Patent
Frankin et al.

(10) Patent No.: US 9,710,261 B2
(45) Date of Patent: Jul. 18, 2017

(54) TECHNIQUES TO ENHANCE SOFTWARE PRODUCTION

(75) Inventors: Douglas Frankin, North Bend, WA (US); Daniel Olewski, Redmond, WA (US); Kenneth Jordan, Redmond, WA (US); Stephen Faiks, Seattle, WA (US); Jason Abbatiello, Duvall, WA (US); Marcus Taylor, Lynnwood, WA (US); Philip Davidson, Carnation, WA (US); John Bowser, Renton, WA (US); Daniel Doubrovkine, Brooklyn, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1039 days.

(21) Appl. No.: 12/775,282

(22) Filed: May 6, 2010

(65) Prior Publication Data

US 2011/0276939 A1      Nov. 10, 2011

(51) Int. Cl.
G06F 9/44 (2006.01)

(52) U.S. Cl.
CPC . *G06F 8/71* (2013.01); *G06F 8/20* (2013.01)

(58) Field of Classification Search
CPC .................................... G06F 8/71; G06F 8/20
See application file for complete search history.

(56) References Cited

U.S. PATENT DOCUMENTS

| | | | |
|---|---|---|---|
| 6,298,476 B1 | 10/2001 | Misheski | |
| 6,626,953 B2 | 9/2003 | Johndrew | |
| 6,658,448 B1* | 12/2003 | Stefaniak et al. | 718/104 |
| 7,003,759 B2* | 2/2006 | Jameson | 717/120 |
| 7,676,788 B1* | 3/2010 | Ousterhout et al. | 717/106 |
| 2002/0029376 A1* | 3/2002 | Ambrose et al. | 717/113 |
| 2002/0166053 A1* | 11/2002 | Wilson | G06F 21/62 713/189 |
| 2003/0028579 A1 | 2/2003 | Kulkarni | |
| 2003/0105871 A1* | 6/2003 | Goldick | 709/229 |
| 2003/0126434 A1* | 7/2003 | Lim | G06F 21/6218 713/164 |
| 2005/0028151 A1* | 2/2005 | Roth | G06F 8/447 717/162 |

(Continued)

OTHER PUBLICATIONS

"Build and release process automation solutions for software development.", IBM Corporation Software Group, Jun. 2006, 28 pages.

(Continued)

*Primary Examiner* — Viva Miller

(57) ABSTRACT

Techniques to enhance software production are described. An apparatus may include a processor and a memory unit to couple to the processor. The memory unit may store a software build service that when executed by the processor is operative to receive a request to subscribe to the software build service from a software development client, create a virtual software build platform to build a software application, and assign multiple build resources from a resource pool to the virtual software build platform to build the software application, with each of the multiple build resources having one or more assigned affinity relationships for build execution tasks to build the software application. Other embodiments are described and claimed.

20 Claims, 8 Drawing Sheets

(56) References Cited

U.S. PATENT DOCUMENTS

| | | | | |
|---|---|---|---|---|
| 2005/0066328 | A1* | 3/2005 | Lam | G06F 9/5083 718/100 |
| 2005/0108713 | A1* | 5/2005 | Geye | G06F 9/5033 718/100 |
| 2005/0256882 | A1* | 11/2005 | Able et al. | 707/10 |
| 2006/0059253 | A1* | 3/2006 | Goodman | G06Q 10/10 709/223 |
| 2006/0129605 | A1* | 6/2006 | Doshi | 707/104.1 |
| 2006/0206871 | A1* | 9/2006 | Kohlmeier | G06F 9/4448 717/132 |
| 2007/0118844 | A1* | 5/2007 | Huang et al. | 719/330 |
| 2007/0136470 | A1* | 6/2007 | Chikkareddy | G06F 9/4448 709/226 |
| 2009/0126006 | A1* | 5/2009 | Zhang | G06F 9/5033 726/17 |
| 2009/0222787 | A1* | 9/2009 | Aldahleh | G06F 9/4448 717/101 |
| 2010/0011361 | A1* | 1/2010 | Millmore | G06F 21/6218 718/100 |
| 2011/0239220 | A1* | 9/2011 | Gibson | G06F 1/3206 718/103 |

OTHER PUBLICATIONS

"Welcome to the openSUSE Build Service", Retrieved Date: Mar. 5, 2010, https://build.opensuse.org/, 3 pages.

Nassar, Tamer et al., "Software as a service: Build a Web-delivered Saas framework for forms and workflow-driven applications", http://www.ibm.com/developerworks/architecture/library/ar-saasframe/, Dec. 16, 2008, 13 pages.

"Force.Com: The Leading Cloud Platform for Business Apps", Retrieved Date: Mar. 5, 2010, http://www.salesforce.com/platform/cloud-platform/, 3 pages.

"CollabNet TeamForge", Retrieved Date: Mar. 5, 2010, http://www.aservo.com/en/software-development/collabnet/sourceforge/, 1 page.

"Acquia Hosting Product Overview", Retrieved Date: Mar. 5, 2010, http://acquia.com/files/marketing/0030_Acquia_Hosting.pdf, 4 pages.

* cited by examiner

Operating Environment 200

TECHNIQUES TO ENHANCE SOFTWARE PRODUCTION

BACKGROUND

Software production typically involves a build process that takes source files and compiles them into a binary package for delivery. Some software production projects may have tens of thousands of source files having a complex dependency structure. As such software production is often a time and resource intensive process, and therefore becomes a limiting factor to software product innovation and predictable delivery. It is with respect to these and other problems that enhanced software production techniques are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, for example, an apparatus may include a processor and a memory unit to couple to the processor. The memory unit may store a software build service that when executed by the processor is operative to receive a request to subscribe to the software build service from a software development client, create a virtual software build platform to build a software application, and assign multiple build resources from a resource pool to the virtual software build platform to build the software application, with each of the multiple build resources having one or more assigned affinity relationships for build execution tasks to build the software application. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
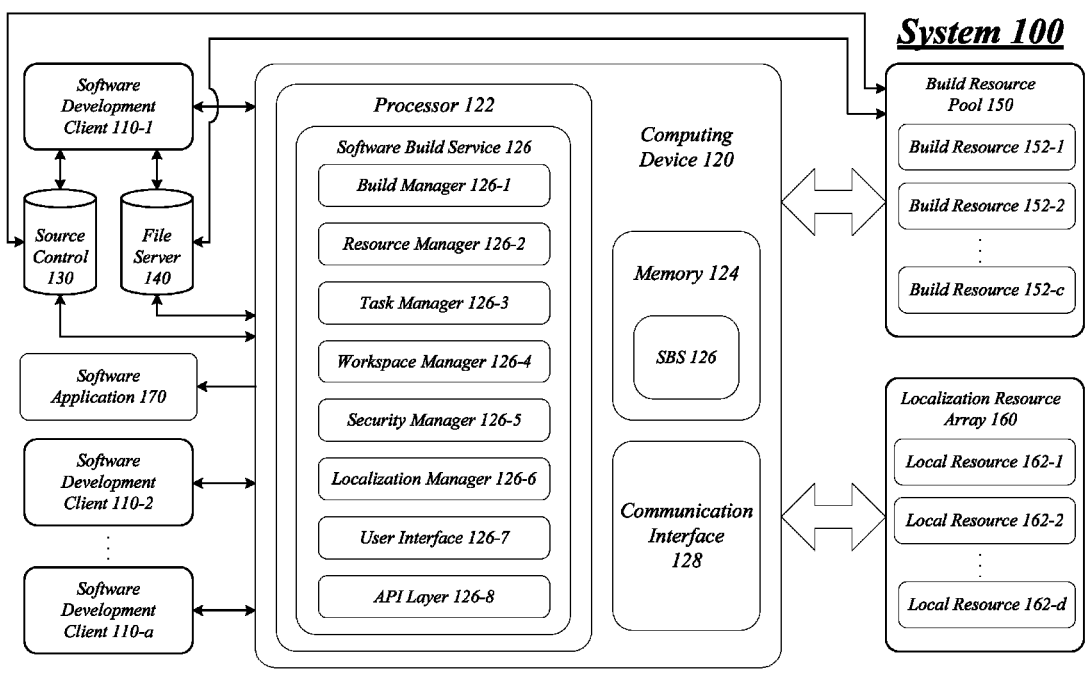
FIG. 1 illustrates an embodiment of a first system.

Various embodiments are directed to techniques for enhancing software production utilizing a software production service. The software build service may automatically generate a virtual software build platform specifically tailored to building and packaging a given software application. Software production teams may use software development clients to access the virtual software build platform and to collaborate and produce software applications using a set of build resources automatically matched to design requirements for a given software application. The virtual software build platform may be used to compile computer source code into binary code, package the binary code, run tests, deploy the binary code to production systems, create documentation and release notes, localize the source code and/or binary code for a particular geographic region, and any other build automation tasks.

The software build service offers automated build tools as part of the centralized services being provided. In one embodiment, the software production teams typically manage their sources via source control. Teams are responsible for requesting, scheduling, monitoring, setting up, and fixing their builds through the software build service. The software build service will then dynamically run the build process and push the final output to a file server that is provided by the software build service. The software build service is extensible and able to integrate with deployment systems that can get those finished products into test and production environments. The sources can also come from editors instead of developers who are building the content that is associated with the products. System validations, instrumentation, backups, and other build tools are integrated to help streamline the development process. The software build service also integrates a localization process that takes generated files and uses them as the source for the localization process. It does this by registering the software builds into the localization service, distributing the files to localizers who translate the files, validating the localized content via the software build service, and finally pushing the localized content back into the content management or source control systems once they pass validation.

In one embodiment, when implemented as software, the software build service may be implemented using one or more computing devices. The computing device may comprise, for example, a web server designed to provide web-based services. The computing device may include a processor and a memory unit to couple to the processor. The memory unit may store a software build service that when executed by the processor is operative to receive a request to subscribe to the software build service from a software development client, create a virtual software build platform to build a software application, and assign multiple build resources from a resource pool to the virtual software build platform to build the software application, with each of the multiple build resources having one or more assigned affinity relationships for build execution tasks to build the software application. The affinity relationship allows the software build service to efficiently and effectively assign build execution tasks to appropriate build resources suited to a given set of design parameters for the software application and/or software production team, while also avoiding assigning tasks to build resources that would be incompatible with the task. The build execution tasks may then be executed by the build resources in a sequential or parallel manner to reduce software build times.

The software build service provides several advantages over conventional automated build tools. For instance, software production teams experience increased build performance and on demand scalability by distributing builds over a shared pool of many dynamically managed machines. In another example, the software build service is product and build tool agnostic. There are no special requirements for software development teams to change their build process and build tools to leverage the software build service. In yet another example, details such as build machine management, build scheduling, and other build operations are abstracted out from the typical software development process. In still another example, the software build service provides customizable extension points for additional build related services, such as gated check-in, localization, code signing, and other build services. The software build service also provides other advantages as discussed in more detail below.

FIG. 1 illustrates a block diagram for a system 100 designed to automatically generate a virtual software build platform to build a software application 170. As shown, the system 100 comprises one or more software development clients 110-1-a, a computing device 120, a build resource pool 150, and a localization resource array 160. Each software development client 110-1-a may be communicatively coupled to a source control 130 and a file server 140, as shown for the software development client 110-1. Although the system 100 as shown in FIG. 1 has a limited number of elements in a certain topology, it may be appreciated that the system 100 may include more or less elements in alternate topologies as desired for a given implementation.

In various embodiments, the system 100 may comprise a computer-implemented system 100 having multiple components, programs or modules. As used herein these terms are intended to refer to a computer-related entity, comprising either hardware, a combination of hardware and software, software, or software in execution. For example, a component can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, some or all of the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a mainframe computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

The various components of system 100 may be communicatively coupled via various types of communications media as indicated by various lines or arrows. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 1, the system 100 may comprise one or more software development clients 110-1-a. The software development clients 110-1-a may comprise client devices implemented using any of the electronic devices previously listed for the system 100. In one embodiment, for example, the software development clients 110-1-a may be implemented as computing devices, such as a handheld computer, notebook computer, personal computer, work station, and any other computing device consistent with the described embodiments. In general operation, members of a software production team may use the software development clients 110-1-a to access software build services provided by the computing device 120. In some cases, the software development clients 110-1-a may be used to subscribe to software build services offered by one or more network servers under a "cloud computing" model. In this manner, various members of the software production team may collaborate and build the software application 170 without individually managing any build resources, such as various generic and customized build machines, workspaces, build execution tasks, and other components typically used during a build process.

Each software development client 110-1-a may be communicatively coupled to a source control 130 and a file server 140, as shown for the software development client 110-1. In one embodiment, each software development team may implement various source control solutions for a given software application. As such, the software development clients 110-1-a may control and manage source files for the software application 170 using the source control 130. The file server 140 may store results from a build session of the software build service 126, including intermediate and executable files. Furthermore, the software development clients 110-1-a may control, manage and store source files, and store and manage intermediate and executable files using the file server 140. Additionally or alternatively, the source control 130 and the file server 140 operations may be implemented under the control of the software build service 126.

The system 100 may comprise the computing device 120. The computing device 120 may implement a processor 122, a memory 124, a software build service 126 and a communication interface 128. The processor 122, the memory 124 and the communication interface 128 are standard computing components and may be described in more detail with reference to FIG. 7. Although the computing device 120 as shown in FIG. 1 has a limited number of elements in a certain arrangement, it may be appreciated that the computing device 120 may include more or less elements in alternate arrangements as desired for a given implementation.

In various embodiments, the software build service 126 may offer online software production or build services. In one embodiment, for example, the software build service 126 may be implemented as a web service made accessible to the one or more software development clients 110-1-a over a public or private network. As such, the software build service 126 may be implemented as a library of application program interfaces (API) or web API that can be accessed over a network, such as a private or public network (e.g., the Internet), and executed on a remote system hosting the requested services (e.g., the computing device 120). As shown, the software build service 126 may comprise various software build service components 126-1-b, including a build manager 126-1, a resource manager 126-2, a task manager 126-3, a workspace manager 126-4, a security manager 126-5, a localization manager 126-6 and a user interface 126-7. It may be appreciated that the software build service 126 may comprise other software build service components 126-1-b consistent with the described embodiments.

The system 100 may comprise the build resource pool 150. The build resource pool 150 may comprise various build resources 152-1-c suitable for use in executing build execution tasks for building the software application 170. The build resources 152-1-c may include, for example, various generic and customized build machines implemented with build service interfaces for communicating with the software build service 126. A build machine is any electronic device useful for a build process, such as a computing device implemented as different types of servers. For example, the build resources 152-1-c may comprise a generic server having general hardware capable of running any general type of server software, such as compilers, linkers, software libraries, include libraries, and so forth. In another example, the build resources 152-1-c may comprise a customized or specialized server with custom hardware capable of running any specific types of server software. The custom hardware may include faster processors, multi-processor systems, increased memory resources, increased storage resources, custom interfaces, custom applications (e.g., trusted computing applications, federated applications, etc.), and so forth. The build resources 152-1-c may also include, for example, portions of a build machine, such as memory resources and storage resources.

In one embodiment, for example, the build resource pool 150 may comprise multiple build resources 152-1-c implemented as a set of identical configured general-purpose build machines capable of running any of the build execution tasks needed to build the software application 170. This enables any build resource 152-1-c to generically run any build execution task at any given time to allow theoretical maximum job output. Additionally or alternatively, the build resources 152-1-c may include special-purpose build machines for special purpose processing as needed for the software application 170.

The system 100 may comprise the localization resource array 160. The localization resource array 160 may comprise various local resources 162-1-d suitable for use in customizing the software application 170 for use in a particular geographic region. As with the build resources 152-1-c, the local resources 162-1-d may include, for example, various generic and customized localization machines implemented with build service interfaces for communicating with the software build service 126. A localization machine is any electronic device useful for a localization process, such as servers to customize the software application and/or software application package for a particular geographic region, including language conversion, function conversions, networking conversions, and so forth.

In general operation, the software build service 126 may be implemented using the computing device 120. The memory unit 124 may store the software build service 126 that when executed by the processor 122 is arranged to receive a request to subscribe to the software build service from a software development client 110-1-a. Once subscription operations have been completed, the software build service 126 creates a virtual software build platform to build the software application 170 developed by a software production team using the software development client 110-1-a. During creation of the virtual software build platform, the software build service 126 assigns multiple build resources 152-1-c from the resource pool 150 to the virtual software build platform used to build the software application. In various embodiments, each of the assigned build resources 152-1-c may have one or more assigned affinity relationships for build execution tasks to build the software application. The affinity relationship allows the software build service 126 to efficiently and effectively assign build execution tasks to appropriate build resources 152-1-c suited to a given set of design parameters for the software application and/or software production team. The build execution tasks may then be executed by the build resources 152-1-c in a sequential or parallel manner, or any combination thereof, to reduce software build times. In the parallel case, the build execution tasks may be executed by the build resources 152-1-c in accordance with a distributed build schedule. The system 100 in general, and the software build service 126 in particular, may be described in further detail with reference to FIGS. 2-8.

Figure 2:
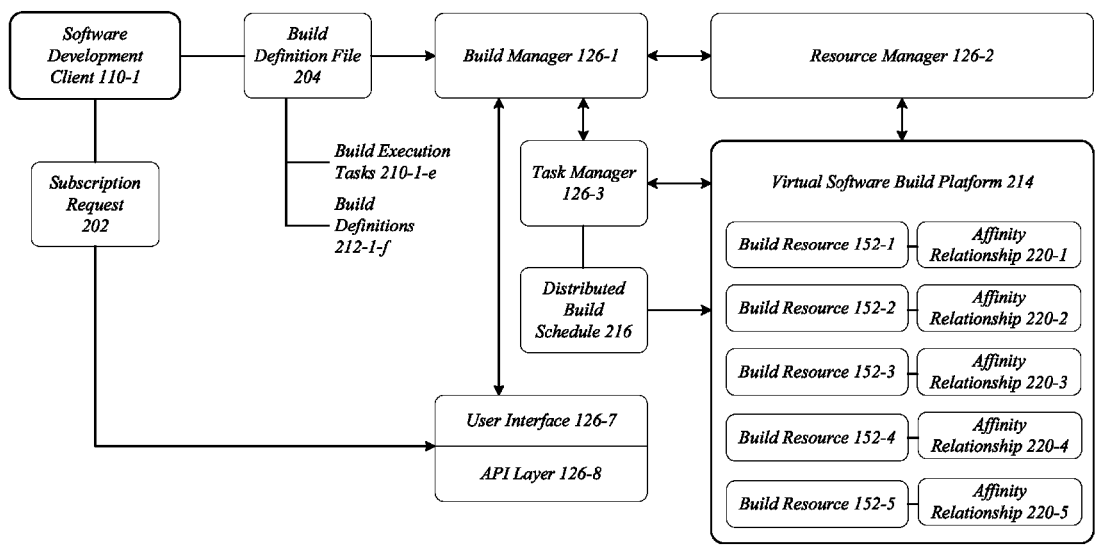
FIG. 2 illustrates an embodiment of a first operating environment.

FIG. 2 illustrates an operating environment 200. The operating environment 200 provides an example of the software build service 126 creating a virtual software build platform arranged to build the software application 170. Although the operating environment as shown in FIG. 2 has a limited number of elements in a certain arrangement, it may be appreciated that the operating environment 200 may include more or less elements in alternate arrangements as desired for a given implementation.

In the illustrated embodiment shown in FIG. 2, the operating environment 200 illustrates the software development client 110-1 sending a subscription request 202 to the software build service 126 via an API layer 126-8 and/or the user interface 126-7. The API layer 126-8 may be used to program customized access to the software build service 126. Additionally or alternatively, the API layer 126-8 may provide access to features provided by the user interface 126-7. A software production team may use the software development client 110-1 to subscribe to the software build service 126 to access the build services provided by the software build service 126.

The software build service 126 may receive the subscription request 202 from the software development client 110-1, and process the subscription request 202 to allow the software development client 110-1 to subscribe to the build services offered by the software build service 126. The subscription request 202 may include business information and/or security information required by the software build service 126 to allow access to various services and features provided by the software build service 126. For instance, the subscription request 202 may include a list of authorized users for a given software production team, authentication information, security information, payment information, product information, and so forth.

Once subscribed to the software build service 126, the software development client 110-1 may send a build definition file 204. In one embodiment, for example, the software production team is responsible for providing certain information and build definitions to the software build service 126. For instance, the software production team is responsible for requesting, scheduling, monitoring, and fixing the software builds via the software build service 126. Further, the software production team controls access to source control 130 and file server 140 (e.g., also referred to as a "drop server" or "release server.") The software production team further defines build retention and backup policies for the produced build. The software production team also manages the source control 130, builds scripts, and particular build tools. The software production team also ensures the build process is completely automated and can be run without human interaction. The software production team further manages quality gates for build/check-in, such as "gauntlet" gates, babysitter gates, rolling gates, continuous integration gates, "buddy builds," and so forth. This information and build definitions may be provided by the build definition file 204.

The build definition file 204 may comprise a structured input file or build script having formal definitions for automatically building executable programs and libraries from source code. The software application 170 may have literally tens of thousands of source files having complex interdependencies. The build definition file 204 specifies how to compile and link a target executable program from each of its dependencies. In one embodiment, for example, the build definition file 204 may comprise an NMAKE file as developed by MICROSOFT® Corporation, Redmond, Wash. Other examples of a build definition file 204 may include without limitation a Make file and its variants (e.g., cmake, imake, premake, qmake, wmake, etc.), a Berkeley Software Distribution (BSD) file and its variants (e.g., FreeBSD, NetBSD, OpenBSD, etc.), a Portable Operating System Inteface (POSIX) file, and any other structured input files used to describe a software build process, design parameters, and dependencies.

In one embodiment, the build definition file 204 may specifically include a list of build execution tasks 210-1-*e* and build definitions 212-1-*f*. A software production team subscribing to the software build service 126 and utilizing the software development client 110-1 to access the computing device 120 may precisely control a build process by explicitly defining the build execution tasks 210-1-*e* needed to create the software application 170. A build execution task 210-1-*e* typically refers to a "job" or discrete portion of a program build. In one embodiment, each build execution task 210-1-*e* may comprise a series of operations to produce a target file or set of target files. In this case, examples of build execution tasks 210-1-*e* may include without limitation reading from a file, writing to a file, deleting a file, renaming a file, compiling a source file, linking an object file, and so forth. The build execution tasks 210-1-*e* may be executed across multiple build resources 152-1-*c* under control the build manager 126-1. The build definitions 212-1-*f* may include various instructions, design parameters and file dependency information.

The build manager 126-1 of the software build service 126 generally manages the build process provided by the software build service 126. The build manager 126-1 may receive the build definition file 204 and use it to create a virtual software build platform 214. The build manager 126-1 may parse and analyze the build definition file 204, and use its analysis to create the virtual software build platform 214 to build the software application 170. For instance, the build manager 126-1 may send a control directive to the resource manager 126-2 to assign build resources 152-1-*c* to the virtual software build platform 214.

The resource manager 126-2 of the software build service 126 generally manages the build resources 152-1-*c* of the resource pool 150. The resource manager 126-2 manages a pool of build machines with no special relationship to a build execution task by default. When the build resource pool 150 is expanded, the resource manager 126-2 may receive a build resource 152-1-*c* for in-processing and assignment to the resource pool 150 for use with a virtual software build platform. Initially, the build resource 152-1-*c* comprises a generic or general-purpose build resource having no previous associations with any build execution tasks 210-1-*e* for building the software application 170 during a software build session on the virtual software build platform 214. The resource manager 126-2 installs a task service module on the build resource 152-1-*c* for interoperation with a task manager 126-3 for the virtual software build platform 214.

The resource manager 126-2 is arranged to assign one or more affinity relationships 220-1-*g* to each of the build resources 152-1-*c*. An affinity relationship 220-1-*g* represents or defines a state of association between a build execution task 210-1-*e* and a given build resource 152-1-*c*. The affinity relationship 220-1-*g* may be used to allocate build resources 152-1-*c* to the virtual software build platform 214. The affinity relationship 220-1-*g* may also be used to schedule build execution tasks 210-1-*e* to a build resource 152-1-*c*. In one embodiment, there are four defined affinity relationships 220-1-*g*, comprising a type one affinity relationship 220-1, a type two affinity relationship 220-2, a type three affinity relationship 220-3, and a type four affinity relationship 220-4. In one embodiment, a default affinity relationship, referred to herein as type five affinity relationship 220-5 may be initially assigned or assigned by default to a build resource when placed as a generic resource in the resource pool 150. It may be appreciated that other embodiments may have more or less affinity relationships 220-1-*g* as desired for a given implementation. The embodiments are not limited in this context.

In one embodiment, the resource manager 126-2 may assign a type one affinity relationship 220-1 to a build resource, a build task or both a build resource and a build task. The type one affinity relationship indicates a build resource 152-1-*c* (e.g., build resource 152-1) can execute a specific build execution task 210-1-*e* (e.g., build execution task 210-1) and other build execution tasks 210-2-*e* (e.g., build execution tasks 210-2, 210-3) during a software build session. In addition, the specific build execution task 210-1 cannot be executed by another build resource 152-1-*c* (e.g., build resource 152-2) during a software build session. An example where this is useful is when a product's build needs to be running in an isolated environment (e.g., for security reasons) where their specific execution tasks 210-1-*e* are only permitted to execute on those specific build resources 152-1-*c*. This may also be advantageous in cases such as when a Product X is being written to use a new set of libraries. Assume these libraries are available only on the build resource 152-1, 152-2. Build execution tasks 210-1-*e* for Product X are set with type one affinity relationship 220-2 to ensure that they will only run on the build resources 152-1, 152-2 since they have operating environments to support a special requirement of Product X.

In one embodiment, the resource manager 126-2 may assign a type two affinity relationship 220-2 to a build resource, a build task or both a build resource and a build task. The type two affinity relationship 220-2 indicates a build resource 152-1-*c* can execute only a specific build execution task 210-1-*e* (e.g., build execution task 210-1) and no other build execution tasks 210-1-*e* (e.g., build execution tasks 210-2, 210-3) during a software build session. However, the specific build execution task 210-1 can execute on other build resources 152-1-*c* (e.g., build resources 152-2, 152-3). This may be advantageous in cases such as when a Product X requires fast turn-around for it's builds. Build execution tasks 210-1-*e* for Product X are set with type two affinity relationship 220-2 to ensure that build resource 152-2 will always be free to build Product X, and will never be tied up busy by the build of another Product Y.

In one embodiment, the resource manager 126-2 may assign a type three affinity relationship 220-3 to a build resource, a build task or both a build resource and a build task. The type three affinity relationship 220-3 indicates a build resource 152-1-*c* (e.g., build resource 152-1) can execute only a specific build execution task 210-1-*e* (e.g., 210-1) and no other build execution tasks 210-1-*e* (e.g., 210-2, 210-3) during a software build session. Furthermore, the specific build execution task 210-1 can only execute on the build resource 152-1. In other words, the build execution task 210-1 and the build resource 152-1 are mutually bound. This may be particularly advantageous in cases where a team provides a dedicated build resource 152-1-*c* with a custom operating environment to be used as part of their build process. A specific build execution task 210-1-*e* gets set to the resource type three affinity 220-3 associated with a specific build resource 152-1-*c*.

In one embodiment, the resource manager 126-2 may assign a type four affinity relationship 220-4 to a build resource, a build task or both a build resource and a build task. The type four affinity relationship 220-4 indicates a build resource 152-1-*c* (e.g., 152-1) cannot execute a specific build execution task 210-1-*e* (e.g., 210-1) during a software build session. In addition, the specific build execution task 210-1 cannot be executed by the build resource 152-1 during the software build session. In other words, the build resource 152-1 and the build execution task 210-1 are mutually exclusive. For example, Beta versions of some software are installed on some machines and some build execution tasks will fail when run on machines with the Beta software. With the type four affinity relationship 220-4, build execution tasks 210-1-*e* that would fail when run on build resources 152-1-*c* will be excluded from being able to use these build resources 152-1-*c*.

In one embodiment, the resource manager 126-2 may assign a default affinity relationship 220-5 to a build resource, a build task or both a build resource and a build task. The default affinity relationship 220-1 indicates a build resource 152-1-*c* can execute any build execution task 210-1-*e* during a software build session. The default affinity relationship 220-5 is the default state assigned to build machines that allows any build execution task 210-1-*e* to execute on the build resource 152-1-*c* until its affinity relationship 220-1-*g* has been modified to another affinity relationship 220-1-*g*.

It is worthy to note that a single build resource 152-1-*c* may be assigned multiple affinity relationships 220-1-*g*. For instance, a build resource 152-1 may be assigned a type one affinity relationship 220-1 and a type four affinity relationship 220-4. This would allow the build resource 152-1 to execute a specific build execution task 210-1 while restricting execution of a specific build execution task 210-2. The resource manager 126-2 may have logic to ensure conflicting affinity relationships 220-1-*g* are not assigned to a single build resource 152-1-*c*.

In response to the control directive from the build manager 126-1, the resource manager 126-2 may select and assign multiple build resources 152-1-*c* from the resource pool 150 to the virtual software build platform 214 to build the software application 170. Each of the multiple build resources 152-1-*c* may have one or more assigned affinity relationships 220-1-*g* for build execution tasks 210-1-*e* used to build the software application 170. As shown in FIG. 2, for example, the resource manager 126-2 has assigned the virtual software build platform 214 five build resources 152-1, 152-2, 152-3, 152-4 and 152-5 having corresponding affinity relationships 220-1, 220-2, 220-3, 220-4 and 220-5. An affinity relationship 220-1-*g* for a build resource 152-1-*c* may be modified at any time during the build process by the resource manager 126-2.

The resource manager 126-2 may select the specific build resources 152-1-*c* for the virtual software build platform 214 based on the build execution tasks 210-1-*e* and the build definitions 212-1-*f* communicated with the build definition file 204, and also based on the affinity relationships 220-1-*g*. For instance, some build resources 152-1-*c* may have special software installed for a particular set of build execution tasks 210-1-*e*. The special software may include different types of system programs, application programs, and so forth. In another example, some build resources 152-1-*c* may have special hardware installed for a particular set of build execution tasks 210-1-*e*, including hardware for improving computing capabilities (e.g., multiple processors and/or processing cores, special-purpose co-processors, and so forth), hardware for improving communications capabilities (e.g., baseband processors, communications processors, special network connections, different radios, and so forth), hardware for enhancing memory resources (e.g., increased number of volatile or non-volatile memory units, increased amounts of cache memory, and so forth), special input/output (I/O) devices, and other configurable hardware features for a computing device. In yet another example, some build resources 152-1-*c* may have application-specific software and/or hardware installed for a particular set of build execution tasks 210-1-*e*, such as security platforms, thermal control platforms, modular platforms, and so forth.

Once the virtual software build platform 214 has been created, the build manager 126-1 may send a control directive to the task manager 126-3. The task manager 126-3 may be generally arranged to assign and schedule build execution tasks 210-1-*e* for execution by the build resources 152-1-*c* assigned to the virtual software build platform 214. The task manager 126-3 may use a task scheduling algorithm to assign and schedule the build execution tasks 210-1-*e* for sequential builds or parallel builds using a distributed build schedule 216. A "distributed build" refers to an architecture where actual calls to the compiler and linkers and other build operations can be served out from multiple locations in parallel for improving the speed of the build. As with assigning build resources 152-1-*c* to the virtual software build platform 214, the task manager 126-3 may use the affinity relationships 220-1-*g* to generate the distributed build schedule 216.

The task manager 126-3 makes no special requirement on the software build tools allowing diverse and non related projects to use and co-exist in the software build service 126. A build process, used by a particular software production team, leverages the software build service infrastructure. After all the scheduling, delegation and management performed by the software build service 126, the build process coalesces into a defined set of build execution tasks 210-1-*e* to execute by the virtual software build platform 214. These build execution tasks 210-1-*e* are scheduled and executed per instructions from the task manager 126-3. In some embodiments, these build execution tasks 210-1-*e* are guaranteed to be product specific and owned by the software production teams who can engineer them per their specific needs. The build process, however, may be dynamic instead of static. As such, the build process may continually modify a set of build execution tasks 210-1-*e* for execution by different build resources 152-1-*c* of the virtual software build platform 214 as the build progresses. Modifications may include changing affinity relationships 220-1-*g* for build resources 152-1-*c*. Such dynamic modifications may occur for any number of factors, including changes in build definitions, performance of build resources 152-1-*c*, priority of builds, and so forth. The embodiments are not limited in this context.

The task manager 126-3 may schedule build execution tasks 210-1-*e* for execution by the build resources 152-1-*c* using a specific set of design rules and parameters, including those provided by the build definitions 212-1-*f*. In one embodiment, the task manager 126-3 employs a machine selection algorithm which considers factors such as machine performance and cached workspaces to optimize task throughput.

Once the task manager 126-3 has scheduled the build execution tasks 210-1-*e* for execution by the multiple build resources 152-1-*c* based on the distributed build schedule 216 and the assigned affinity relationships 220-1-*g*, the build manager 126-1 may initiate the build process causing each of the build execution tasks 210-1-*e* to be executed by the multiple build resources 152-1-*c* in accordance with the distributed build schedule 216 to convert multiple source code files into binary code files. The source code files may be retrieved from the source control 130 and/or the file server 140 controlled by the software development client 110-1. The resulting binary code files may be packaged to form a software application package for the software application 170.

Figure 3:
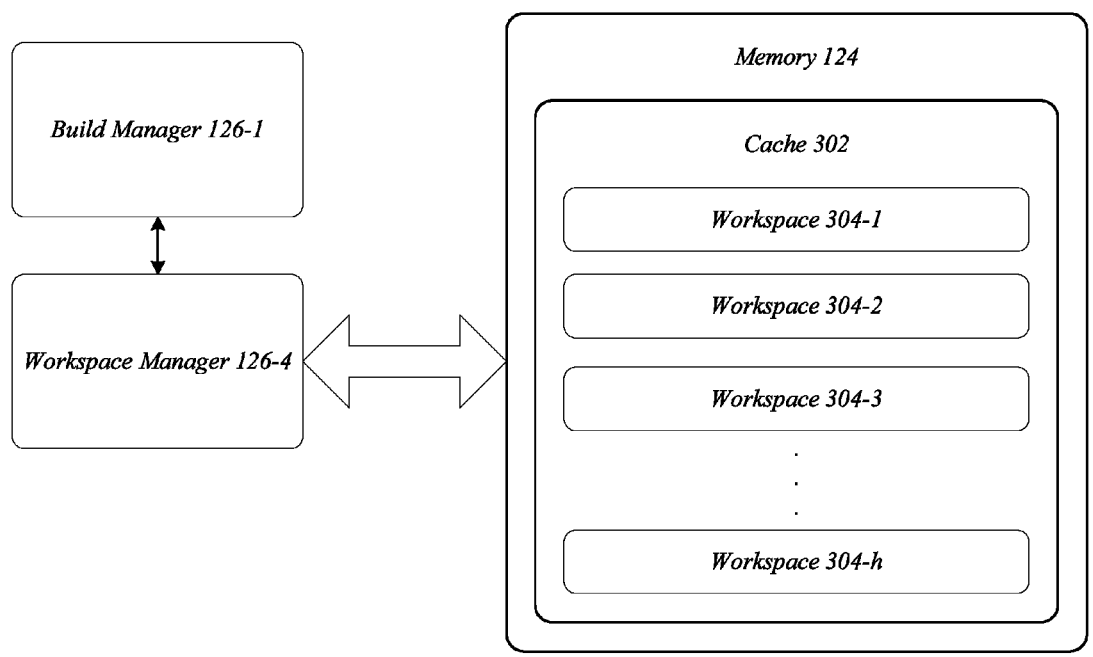
FIG. 3 illustrates an embodiment of a second operating environment.

FIG. 3 illustrates an operating environment 300. The operating environment 300 provides an example of the software build service 126 creating one or more dynamic workspaces 304-1-*h* for the virtual software build platform 214 arranged to build the software application 170. Although the operating environment as shown in FIG. 3 has a limited number of elements in a certain arrangement, it may be appreciated that the operating environment 300 may include more or less elements in alternate arrangements as desired for a given implementation.

The workspace manager 126-4 of the software build service 126 may be generally arranged to control and manage one or more dynamic workspaces 304-1-*h* for the virtual software build platform 214 arranged to build the software application 170. In one embodiment, for example, the workspace manager 126-4 may be arranged to allocate one or more workspaces 304-1-*h* for execution of the build execution tasks 210-1-*e*.

The workspace manager 126-4 uses dynamic workspace management techniques to enable any available build machine to execute incoming build execution tasks 210-1-*e*. Software production teams can use various source control solutions for their software production projects. When configuring their build processes in the software build service 126 they will define locations and access information to their sources. The mappings may be defined, for example, in the build definition file 204. As part of the delegation of a particular build execution task 210-1-*e* to a build resource 152-1-*c*, one or more workspaces 304-1-*h* for the build execution task 210-1-*e* will be prepared per the product teams specifications. These workspaces 304-1-*h* are cached in cache 302 of the memory 124 or other long-term storage media to improve efficiency for future runs of the build execution task 210-1-*e*. If necessary the workspaces 304-1-*h* can be removed to make space for a current build execution task 210-1-*e* to keep multiple build execution tasks 210-1-*e* automatically running throughout the virtual software build platform 214 without manual intervention.

Figure 4:
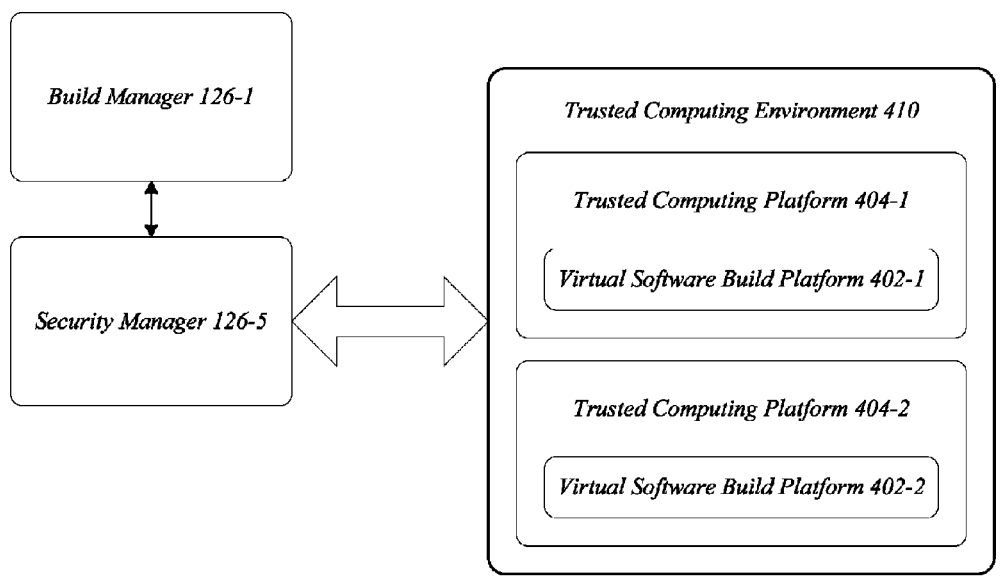
FIG. 4 illustrates an embodiment of a third operating environment.

FIG. 4 illustrates an operating environment 400. The operating environment 400 provides an example of the software build service 126 managing security information for the virtual software build platform 214 arranged to build the software application 170. Although the operating environment as shown in FIG. 4 has a limited number of elements in a certain arrangement, it may be appreciated that the operating environment 400 may include more or less elements in alternate arrangements as desired for a given implementation.

The security manager 126-5 of the software build service 126 may be generally arranged to create a trusted computing environment for different software development clients 110-1-*a*. Since the software build service 126 provides a shared environment, different user credentials can be specified for task execution. This prevents one software development team from being able to access another team's sources. The security manager 126-5 manages these user credentials securely and uses them to secure the managed workspaces 304-1-*h* and execution of build execution tasks 210-1-*e* with specific credentials.

The software build service 126 may provide each of the different software development clients 110-1-*a* with a corresponding virtual software build platform 402-1-*i*. As such, the security manager 126-5 manages security information for each of the software development clients 110-1-*a* to ensure a first software development client 110-1 cannot access secure information for a second software development client 110-2, and vice-versa. The security manager 126-5 may be arranged to manage security credentials for each of the software development clients 110-1-*a* and/or the virtual software build platforms 402-1-*i* to provide a secure execution environment for each of the virtual software build platforms 402-1-*i*.

The build manager 126-1 and the security manager 126-5 may interoperate to create a trusted computing environment 410. Trusted computing is a technology ensuring a computer will consistently behave in expected ways, and those behaviors will be enforced by hardware and software. Enforcing this behavior is achieved by loading the hardware with a unique encryption key inaccessible to other software production teams, for example. The main functionality of trusted computing is to ensure that only authorized code runs on a system. This authorization covers initial booting and kernel and may also cover applications and various scripts.

The trusted computing environment 410 may partition memory and/or devices to create multiple trusted computing platforms 404-1-*j*. Each instantiation of a trusted computing platform 404-1-*j* may comprise trusted computing resources (e.g., processors, memory, security architecture, etc.) to contain a corresponding virtual software build platform 402-1-*i*. As shown, the trusted computing environment 410 may comprise two trusted computing platforms 404-1, 404-2, each containing or protecting a corresponding virtual software build platform 402-1, 402-2. In this manner, source files and binary files produced by the virtual software build platform 402-1 are self-contained and inaccessible by a software development client 110-2, and conversely, source files and binary files produced by the virtual software build platform 402-2 are self-contained and inaccessible by a software development client 110-1.

Figure 5:
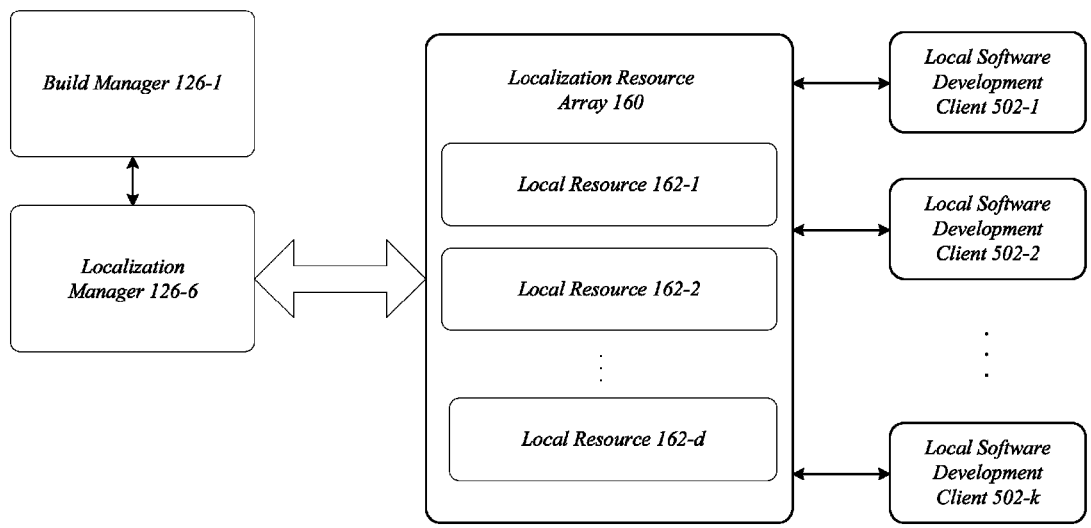
FIG. 5 illustrates an embodiment of a fourth operating environment.

FIG. 5 illustrates an operating environment 500. The operating environment 400 provides an example of the software build service 126 localizing the software application 170. Although the operating environment as shown in FIG. 5 has a limited number of elements in a certain arrangement, it may be appreciated that the operating environment 500 may include more or less elements in alternate arrangements as desired for a given implementation.

The localization manager 126-6 of the software build service 126 may be generally arranged to control and manage localization operations for the software application 170. Once the software application 170 has been successfully built and tested, the software application 170 may be made available to local software production teams to tailor the software application 170 for a specific geographic location. Depending on expected deployment, there may be multiple local software production teams located at geographically disparate locations, each responsible for translations to local languages, local testing, feature modifications, quality checks, client customization and so forth. Normally this requires a significant amount of information hand-off between the original software production team for the software application 170, and a local software production team. To reduce or eliminate overhead associated with such hand-off operations, the localization manager 126-6 may store the hand-off information for each virtual software build platform 402-1-i using a corresponding local resource 162-1-d. Each of the local software production teams utilizing local software development clients 502-1-k, access their respective local resource 162-1-d, and retrieve any information needed to perform localization operations for the software application 170, including the software application 170 itself. This results in a seamless hand-off of information between the original software production team and local software production teams, thereby shortening localization schedules, allowing for automatic translation tools, performing handback quality checks, reducing engineering and overhead costs, and other advantages. Handback quality checks may refer to when the software build service 126 validates that the localized files do not break the build, and checks the files into the source control 130 and/or file server 140.

In addition to the various software build service 126 elements as previously described, the software build service 126 may also provide additional build-related elements and operations. For instance, the software build service 126 may provide various interfaces for gated check-in services, localization services, code signing services, customized interfaces for a specific software production team, generic extensions, and so forth. The software build service 126 may also provide multiple build resources 152-1-c for "buddy builds" and continuous integration, scripts for scheduled builds (e.g., partial re-builds on modification, clean overnight builds, etc.), and other build tools. Additionally or alternatively, the software build service 126 may implement, or interoperate with, source control 130 and file server 130 for source control and file server operations.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion, or any combination of serial and parallel operations. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 6:
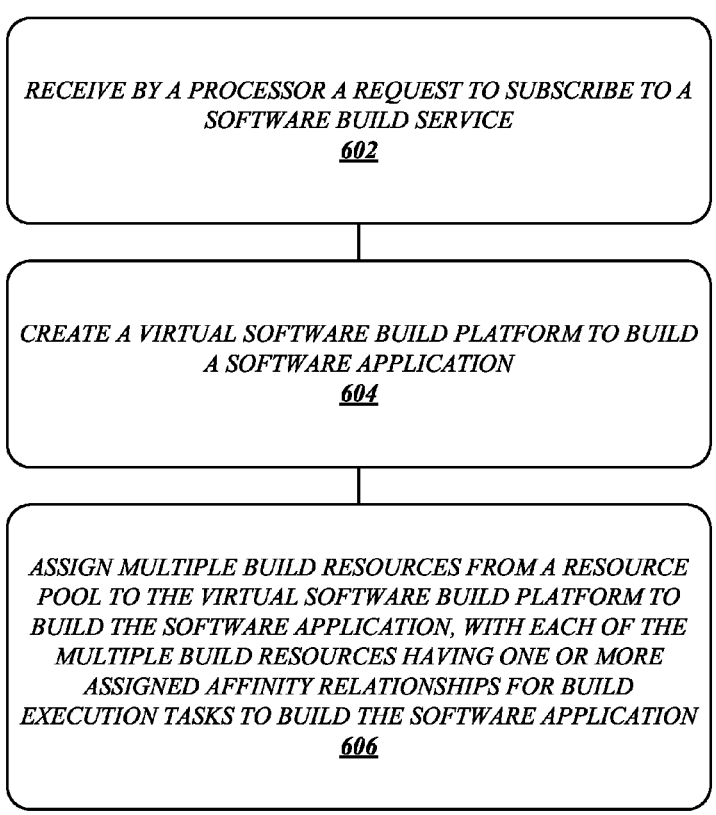
FIG. 6 illustrates an embodiment of a logic flow.

FIG. 6 illustrates one embodiment of a logic flow 600. The logic flow 600 may be representative of some or all of the operations executed by one or more embodiments described herein. In one embodiment, for example, the logic flow 600 may illustrate operations for the software build service 126.

In the illustrated embodiment shown in FIG. 6, the logic flow 600 may receive by a processor a request to subscribe to a software build service at block 602. For example, the user interface 126-7 of the software build service 126 may receive the subscription request 202 to the software build service 126. The subscription request 202 may include business information, product information, billing and payment information, software production team members, security information, and any other information needed to establish an account with the software build service 126.

The logic flow 600 may create a virtual software build platform to build a software application at block 604. For example, the build manager 126-1 may create the virtual software build platform 214 to build the software application 170. In some embodiments, the virtual software build platform 214 may be secured using a trusted computing platform model.

The logic flow 600 may assign multiple build resources from a resource pool to the virtual software build platform to build the software application, with each of the multiple build resources having one or more assigned affinity relationships for build execution tasks to build the software application at block 606. For example, the resource manager 126-2 may assign multiple build resources 152-1-c from the resource pool 150 to the virtual software build platform 214 to build the software application 170. Each of the multiple build resources 152-1-c may have one or more assigned affinity relationships 220-1-g for build execution tasks 210-1-e to build the software application 170. Additionally or alternatively, the affinity relationships 220-1-g for the build resources 152-1-c may be assigned or modified after allocation of the build resources 152-1-c to the virtual software build platform 214.

During or after receiving the subscription request 202, the build manager 126-1 may receive the build definition file 204 with the build execution tasks 210-1-e and build definitions 212-1-f to build the software application 170. Additionally or alternatively, the information communicated by the build definition file 204 may be automatically generated by the build manager 126-1 based on a set of defined rules.

The build manager 126-1 may instruct the resource manager 126-2 to create the virtual software build platform 214. The task manager 126-3 may then schedule the build execution tasks 210-1-e for execution by the multiple build resources 152-1-c based on the distributed build schedule 216 and the assigned affinity relationships 220-1-g. The build resources 152-1-c may then begin executing each of the build execution tasks 210-1-e in accordance with the distributed build schedule 216 to convert multiple source code files into binary code files for the software application 170. The build manager 126-1 may then package the binary code files to form a software application package for the software application 170.

Figure 7:
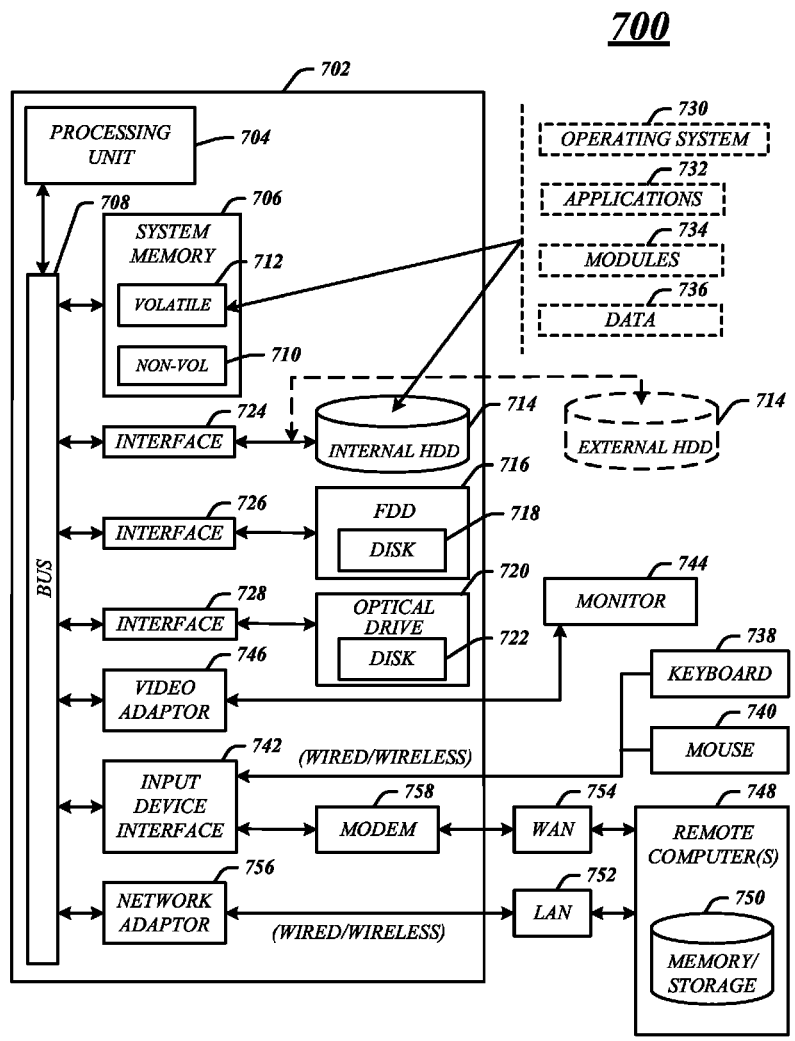
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the software build service 126 and its various components including the build manager 126-1, the resource manager 126-2, the task manager 126-3, the workspace manager 126-4, the security manager 126-5, the localization manager 126-6 and the user interface 126-7, among others.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
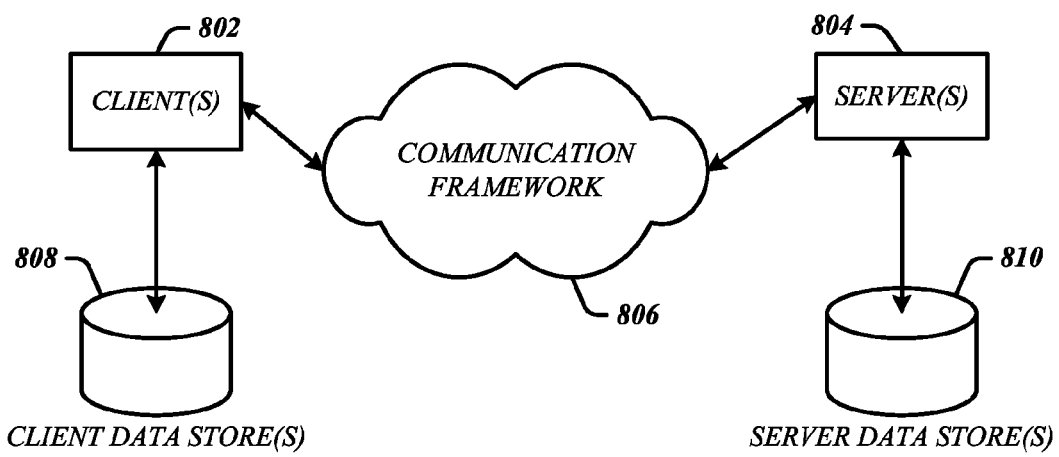
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems, such as the software development clients 110-1-*a* and the local software development clients 502-1-*k*. The servers 804 may implement the computing device 120 implementing the software build service 126. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving by a processor a request to subscribe to a software build service;
creating a virtual software build platform when a subscription operation is complete;
receiving a build definition file with the build execution tasks and build definitions to build the software application;
assigning multiple build resources from a resource pool in a shared environment to the virtual software build platform to build a software application, wherein each build resource of the multiple build resources comprises a build machine configured to execute the build execution tasks;
securing data associated with the build execution tasks with an encryption key; and
scheduling the build execution tasks for execution by the multiple build resources based on a distributed build schedule and assigned affinity relationships, wherein a type of affinity relationship is assigned to a build resource indicating a build machine cannot execute a specific build execution task and that the specific build execution task cannot be executed by the build machine;
executing each of the build execution tasks by the multiple build resources in accordance with the distributed build schedule to convert multiple source code files into binary code files; and
packaging the binary code files to form a software application package for the software application wherein the source code files and the binary code files are self-contained and inaccessible to a software development client.

2. The computer-implemented method of claim 1, wherein the encryption key prevents unauthorized access to the data associated with the build execution tasks and ensures only authorized code for the software application runs on the virtual software build platform.

3. The computer-implemented method of claim 1, comprising allocating one or more workspaces for execution of the build execution tasks.

4. The computer-implemented method of claim 1, comprising loading hardware for the build resource with the security credential.

5. The computer-implemented method of claim 1, comprising assigning one or more affinity relationships to a build resource, a build task or both a build resource and a build task, each affinity relationship representing a relationship between a build execution task and a build resource.

6. The computer-implemented method of claim 1, comprising assigning a default affinity relationship to a build resource, a build task or both a build resource and a build task, the default affinity relationship indicating a build resource can execute any build execution task during a software build session.

7. The computer-implemented method of claim 1, comprising assigning a type one affinity relationship to a build resource, a build task or both a build resource and a build task, the type one affinity relationship indicating a build resource can execute a specific build execution task and other build execution tasks during a software build session, and the specific build execution task cannot be executed by another build resource during a software build session.

8. The computer-implemented method of claim 1, comprising assigning a type two affinity relationship to a build resource, a build task or both a build resource and a build task, the type two affinity relationship indicating a build resource can execute only a specific build execution task and no other build execution tasks during a software build session, and the specific build execution task can execute on other build resources.

9. The computer-implemented method of claim 1, comprising assigning a type three affinity relationship to a build resource, a build task or both a build resource and a build task, the type three affinity relationship indicating a build resource can execute only a specific build execution task and no other build execution tasks during a software build session, and the specific build execution task can only execute on the build resource.

10. The computer-implemented method of claim 1, comprising assigning a type four affinity relationship to a build resource, a build task or both a build resource and a build task, the type four affinity relationship indicating a build resource cannot execute a specific build execution task during a software build session, and the specific build execution task cannot be executed by the build resource during the software build session.

11. An article of manufacture comprising storage hardware containing instructions that when executed enable a system to:
receive a plurality of build resources, each build resource comprising a build machine for assignment to a resource pool for a virtual software build platform, each build resource comprising a generic build machine having the ability to execute build execution tasks for building a software application during a software build session on the virtual software build platform, the virtual software build platform being operative to pack binary code for the software application into a software application package, the binary code being operative to run tests on the software application package and deploy the tested software application package to a production environment;
install a task service module on the build machine for interoperation with a task manager for the virtual software build platform;
provide customizable extension points to the virtual software build platform for additional build services; and
assign one or more affinity relationships to at least one of a build machine or a build task, at least one affinity relationship to identify which of a plurality of build machines cannot execute a specific build execution task and at least one other affinity relationship to indicate which of the plurality of build machines can execute only the specific build execution task and no other build execution tasks during the software build session, wherein the specific build execution task can only execute on the build machine in an isolated environment.

12. The article of claim 11, further comprising instructions that when executed enable the system to assign a default affinity relationship indicating a build machine can execute any build execution task during a software build session.

13. The article of claim 11, further comprising instructions that when executed enable the system to assign a type one affinity relationship indicating a build machine can execute a specific build execution task and other build execution tasks during a software build session, and the specific build execution task cannot be executed by another build machine during a software build session.

14. The article of claim 11, further comprising instructions that when executed enable the system to assign a type two affinity relationship indicating a build machine can execute only a specific build execution task and no other build execution tasks during a software build session, and the specific build execution task can execute on other build machines.

15. The article of claim 11, further comprising instructions that when executed enable the system to continually modify the build execution tasks for execution by different build resources of the virtual software build platform.

16. The article of claim 11, further comprising instructions that when executed enable the system to assign a type four affinity relationship indicating a build machine cannot execute a specific build execution task during a software build session, and the specific build execution task cannot be executed by the build machine during the software build session.

17. An apparatus, comprising:
a processor; and
a memory unit to couple to the processor, the memory unit to store a software build service that when executed by the processor is operative to receive a request to subscribe from a software development client, provide a virtual software build platform to build a software application for the software development client when a subscription operation is complete, assign multiple build resources from a resource pool to the virtual software build platform to build the software application wherein each build resource of the multiple build resources comprises a build machine and the ability to execute all incoming build execution tasks to build the software application, assign an affinity relationship to a build resource indicating a build machine can execute only a specific build execution task and no other build execution tasks during a software build session, and the specific build execution task can execute on other build machines, store hand-off information of a production team resource to produce localized content for the software application corresponding to a geographic region, and validate that the localized content for building the software application does not break the build of the software application, and check the localized content into a source control for the virtual build platform.

18. The apparatus of claim 17, comprising a resource manager operative to assign additional affinity relationships to build resources, the affinity relationship representing relationships between a build execution task and a build resource.

19. The apparatus of claim 17, comprising a workspace manager operative to allocate one or more workspaces for execution of the build execution tasks.

20. The apparatus of claim 17, comprising a security manager operative to manage security credentials for the virtual software build platform to provide a secure execution environment for the virtual software build platform.

* * * * *